Patented June 23, 1931

1,810,989

UNITED STATES PATENT OFFICE

ORVALL SMILEY, OF INDIANAPOLIS, INDIANA

MEANS FOR TREATING SOLIDIFIED CARBON DIOXIDE

No Drawing.   Application filed February 12, 1930. Serial No. 427,997.

This invention relates to means for treating solidified carbon dioxide with any suitable disuniting or separating matter and the prime feature of the invention is the provision of any suitable matter of any suitable size, shape or form and either in liquid, semi-solid or solid form to be incorporated in the solidified product in any suitable manner.

A further feature of the invention is in so commingling the separating particles that the evaporation of the solidified carbon dioxide will be greatly retarded and easily controlled.

A further feature of the invention is in so constructing the prepared particles that they may be made in various shapes and sizes and applied to various uses.

A further feature of the invention is in so controlling the evaporation of the solidified product that a much greater field may be covered with this form of refrigerant at a much reduced cost.

A further feature of the invention is in so commingling the disuniting matter with the solidified carbon dioxide that the product will be in a dry and compact state, when completed.

Other objects and advantages will be hereinafter more fully set forth and pointed out in the accompanying specification.

The use of carbon dioxide, in what is known as solidified form, for refrigerating purposes, is well known, but owing to the more or less rapid rate of evaporation thereof, has not been suitable for general refrigerating purposes, hence it is my intention to provide means for so prolonging the life of the solidified carbon dioxide, without materially increasing the cost thereof, that it may be applied to general refrigeration purposes.

To this end therefore, I commingle with the body of solidified crabon dioxide ($CO_2$), any suitable amount of disuniting or separating matter, such as wool, hair, glass wool, cotton, cotton waste, shells, wood fiber, metal, mineral, ash and wax and many other substances or any suitable liquids, or any mixture of suitable materials or matter that will serve to break up the continuity of the body of carbon dioxide for breaking up and retarding the exudition of the gases therefrom, due to evaporation.

In applying the dividing substances, the carbon dioxide snow is formed between, over and around the dividing substances in any suitable manner and the commingled product then subjected to compression, as is usual in preparing the solidified carbon dioxide in its present form and the whole mass may be formed in any suitable shape and size as may be required for general or special uses.

By treating the carbon dioxide in this manner, the rapid evaporation or giving off of the carbon dioxide gas will be materially retarded, thus greatly prolonging the life of the solidified mass and by properly proportioning the amount of foreign or dividing substance, the degree of or repellant force of the carbon dioxide may be readily increased or decreased, or regulated to meet all subsequent requirements.

What I claim is:

1. Means for treating sclidified carbon dioxide for retarding evaporation thereof, comprising commingling with the mass of solidified substance a dividing element.

2. Means for prolonging the life of a mass of solidified carbon dioxide, consisting in interspersing through the solidified substance a separating medium and subjecting the whole mass to pressure.

3. Means for prolonging the refrigerant life of solidified carbon dioxide ($CO_2$) consisting in intermittently mixing with the solidified mass any disuniting matter and compressing the resultant product.

4. Means for prolonging the refrigerant life of solidified carbon dioxide and retarding the flow of gas therefrom, consisting in mixing or commingling with the solidified carbon dioxide any suitable dividing matter or substance and subsequently compressing the same.

5. Means for prolonging the refrigerant life of solidified carbon dioxide and retarding the flow of gas therefrom, and conserving the vaporization of the carbon dioxide, consisting in commingling with the solidified carbon dioxide any suitable dividing matter or susbtance.

In testimony whereof I hereto affix my signature.

ORVALL SMILEY.